(12) United States Patent
Horiuchi

(10) Patent No.: US 10,727,235 B2
(45) Date of Patent: Jul. 28, 2020

(54) SECURE FINGERPRINT DATA GENERATING DEVICE

(71) Applicant: NSCore, Inc., Fukuoka (JP)

(72) Inventor: Tadahiko Horiuchi, Kanagawa (JP)

(73) Assignee: NSCore, INC., Fukuoka (JP)

( * ) Notice: Subject to any disclaimer, the term of this patent is extended or adjusted under 35 U.S.C. 154(b) by 177 days.

(21) Appl. No.: 16/048,844

(22) Filed: Jul. 30, 2018

(65) Prior Publication Data

US 2020/0035687 A1 Jan. 30, 2020

(51) Int. Cl.

| | | |
|---|---|---|
| *H01L 27/11* | (2006.01) | |
| *H01L 29/08* | (2006.01) | |
| *H01L 27/02* | (2006.01) | |
| *H01L 29/78* | (2006.01) | |
| *H04L 9/32* | (2006.01) | |
| *G11C 11/418* | (2006.01) | |
| *G11C 11/412* | (2006.01) | |

(Continued)

(52) U.S. Cl.
CPC ........ *H01L 27/1104* (2013.01); *G11C 11/412* (2013.01); *G11C 11/418* (2013.01); *G11C 11/419* (2013.01); *H01L 27/0207* (2013.01); *H01L 29/0847* (2013.01); *H01L 29/47* (2013.01); *H01L 29/7835* (2013.01); *H01L 29/7839* (2013.01); *H04L 9/3278* (2013.01)

(58) Field of Classification Search
CPC ... H04L 9/3278; G11C 11/418; G11C 11/412; G11C 11/419; H01L 29/0847; H01L 27/0207; H01L 29/7839; H01L 29/7835
USPC .......................................................... 380/28
See application file for complete search history.

(56) References Cited

U.S. PATENT DOCUMENTS

| | | | | |
|---|---|---|---|---|
| 5,623,262 A | * | 4/1997 | Normile | H03M 7/425 341/106 |
| 8,983,208 B2 | * | 3/2015 | Jaffe | G06K 9/00087 382/115 |
| 9,396,357 B2 | * | 7/2016 | Van Der Leest | H04L 9/0866 |

(Continued)

OTHER PUBLICATIONS

The Resurgence of Software Performance Engineering Charles E. Leiserson :SPAA '18: Proceedings of the 30th on Symposium on Parallelism in Algorithms and Architectures Jul. 2018 pp. 53 (Year: 2018).*

(Continued)

*Primary Examiner* — Kambiz Zand
*Assistant Examiner* — Mohammad S Shams
(74) *Attorney, Agent, or Firm* — The Marbury Law Group, PLLC

(57) ABSTRACT

It is provided a circuit for generating finger print code data comprising: plural pairs of first transistors, each of the first transistors having a source formed in the substrate, a drain formed in the substrate, a channel formed in the substrate between the source and the drain, a gate insulating layer formed on the channel, a gate electrode formed over the gate insulating layer, and an insulating sidewall formed at a side surface of the gate electrode; plural pairs of cross coupled second transistors, each of the plural pairs of cross coupled second transistors having drains and commonly connected sources, corresponding to each of the plural pairs of first transistors; and plural pairs of third transistors, each of the plural pairs of third transistors corresponding to each of the plural pairs of cross coupled second transistors.

20 Claims, 13 Drawing Sheets

(51) Int. Cl.
*H01L 29/47* (2006.01)
*G11C 11/419* (2006.01)

(56) References Cited

U.S. PATENT DOCUMENTS

| | | | |
|---|---|---|---|
| 9,811,689 B1* | 11/2017 | Tseng | G06F 21/73 |
| 9,893,208 B2 | 2/2018 | Horiuchi | |
| 9,966,141 B2 | 5/2018 | Horiuchi | |
| 10,404,478 B2* | 9/2019 | Hung | G11C 7/24 |
| 2014/0325237 A1* | 10/2014 | Van Der Leest | H04L 9/0866 |
| | | | 713/189 |

OTHER PUBLICATIONS

"Signal integrity analysis in the open architecture" Dennis M. Petrich, ASP-DAC '04: Proceedings of the 2004 Asia and South Pacific Design Automation Conference. Jan. 2004 (Year: 2004).*
SRAM PUF, Product brief of INTRINSIC ID website, 2 pages.
Quiddikey Hardware IP Family, Product brief of INSTRINSIC ID website (http://www.intrinsic-id.com/wp-content/uploads/2018/04/QUIDDIKEY-Hardware-IP.pdf).

* cited by examiner

FIG. 13

|  | PRIOR ART | INVENTION |
|---|---|---|
| PUF DATA | 256 bit | 256 bit |
| SRAM | 8 k bit | 256 bit |
| Latency | 100 k cyc | 1 cyc |
| Control Logic | 15 k Gate | none |

SECURE FINGERPRINT DATA GENERATING DEVICE

FIELD

The present invention relates to a secure fingerprint data generating device. More specifically, the present invention is related to a circuit for generating fingerprint code data and a circuit for storing secured code data.

BACKGROUND

It is preferred that a semiconductor device has unique identification information (also called a fingerprint) in order to distinguish individual devices from other devices or to enable encrypted communication between devices. Until now, unique identification information was either individually assigned by a vendor or individually set by a user.

However, it was a burden on vendors and users that vendors individually providing unique identification information or users individually providing unique identification information.

Therefore, semiconductor devices have been developed mounted with a circuit for automatically generating unique identification information. For example, US2014/0325237 to Van Der Leest et al. takes advantage of the fact that data in an initial state at the time of power-on of a SRAM is different for each chip. Since data which is different for each chip does not have high reproducibility, a large-scale error correction process is performed in order to increase reproducibility. Data generated here is called Physical Unclonable Function Data (PUF DATA).

For example, SRAM requires a capacity of 8 Kbit in order to generate 256 bits as PUF DATA. A 100K cycle is required for error correction processing, and a control circuit for achieving this requires a 15K gate.

SUMMARY

According to one embodiment of the present invention is a secure fingerprint data generating device, one of which is a circuit for generating fingerprint code data. A circuit for generating finger print code data comprising: plural pairs of first transistors formed on a semiconductor substrate, each of the first transistors having a source formed in the substrate, a drain formed in the substrate, a channel formed in the substrate between the source and the drain, a gate insulating layer formed on the channel, a gate electrode formed over the gate insulating layer, and an insulating sidewall formed at a side surface of the gate electrode; plural pairs of cross coupled second transistors, each of the plural pairs of cross coupled second transistors, having drains and commonly connected sources, corresponding to each of the plural pairs of first transistors; and plural pairs of third transistors, each of the plural pairs of third transistors corresponding to each of the plural pairs of cross coupled second transistors and providing loads to the drains of the corresponding pairs of cross coupled second transistors, and thereby, generating differential voltages, intrinsic to a specific semiconductor chip on which the circuit for generating finger print code data is formed, at the drains of the corresponding pairs of cross coupled second transistors; wherein the differential voltages are used to selectively trap carriers into the sidewalls of the corresponding pairs of first transistor.

The other embodiment of the present invention is a circuit for storing secured code data. A circuit for storing secured code data comprising: plural pairs of first transistors formed on a semiconductor substrate, each of the first transistors having a source formed in the substrate, a drain formed in the substrate, a channel formed in the substrate between the source and the drain, a gate insulating layer formed on the channel, a gate electrode formed over the gate insulating layer, and an insulating sidewall formed at a side surface of the gate electrode; plural programming circuits, each of the programming circuits corresponding to each of the plural pairs of first transistors and selectively trapping carriers into the sidewalls of the corresponding pairs of first transistors; and plural sensing circuits, each of the sensing circuits corresponding to each of the plural pairs of first transistors and sensing differential currents flowing through the plural pairs of first transistors to generate the secured code data.

BRIEF DESCRIPTION OF DRAWINGS

FIG. 13 is a chart comparing the characteristics of prior art finger print data generation system and this invention.

DESCRIPTION OF EMBODIMENTS

Figure 1:
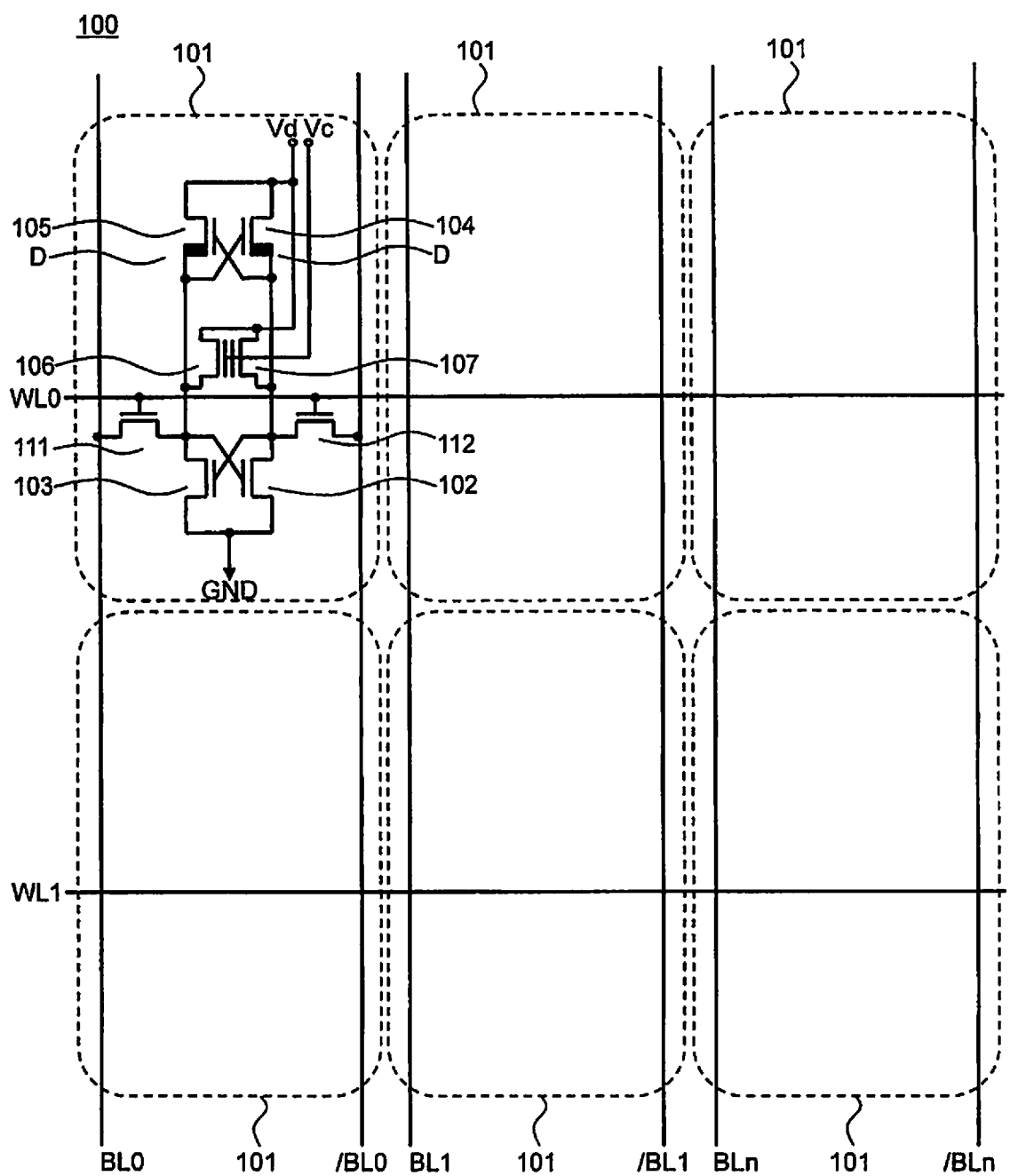
FIG. 1 is a circuit schematic of an array of finger print data generation units (100).

Each embodiment of the present invention is explained below while referring to the drawings. However, the present invention can be implemented in various modes without departing from the gist of the invention and should not to be interpreted as being limited to the content described in the embodiments exemplified below. Although the drawings may be schematically represented in terms of width, thickness, shape and the like of each part compared with their actual mode in order to make explanation clearer, it is only an example and does not limited an interpretation of the present invention.

1. Configuration of a Finger Print Data Generation Circuit Core

FIG. 1 is a circuit schematic diagram of an array of finger print data generation units. An array of finger print data generation units 100 is composed of finger print data generation units 101 arranged in a plurality of rows and a plurality of columns. The array of finger print data generation units 100 includes bit lines BL0, . . . BLn and inverse bit lines/BL0, . . . /BLn running in a vertical direction. Furthermore, the array of finger print data generation units 100 includes word lines WL0, WL1 running in a horizontal direction. In order to generate a 256-bit finger print data, 256 finger print data generation units 101 are prepared. Redundancy is unnecessary. As an example, although bit line pairs may be 128 pairs and word lines may be two, bit line pairs may also be 256 pairs and the number of word lines may also be one. The number of rows and the number of columns can be appropriately set according to the number of bits of finger print data.

Figure 2:
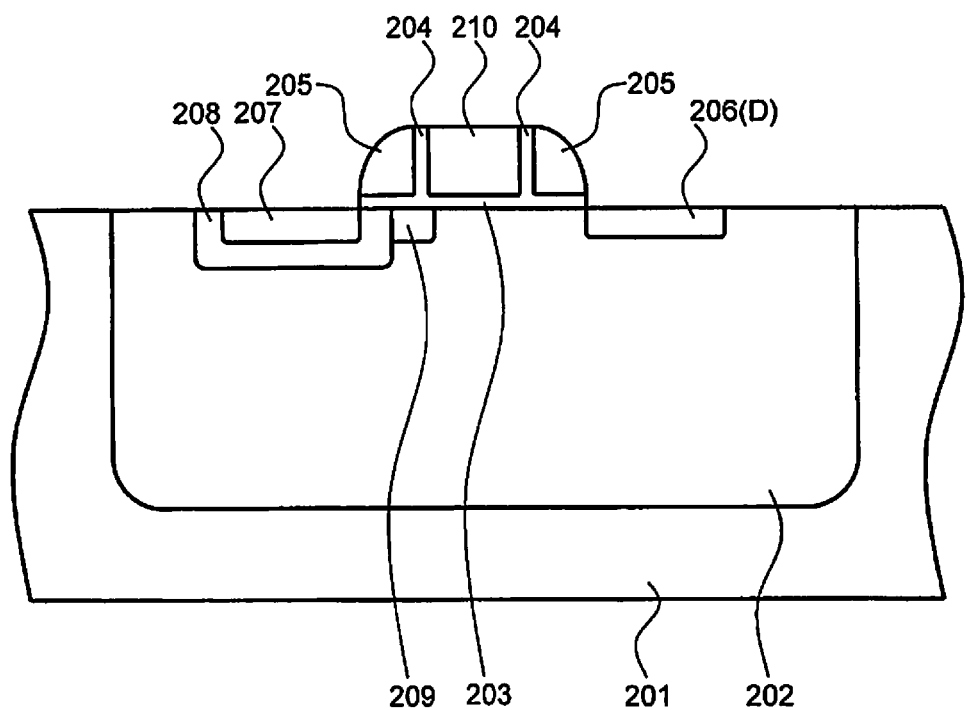
FIG. 2 is a cross sectional view of PMOS transistors 104 and 105 (200).

Each of the finger print data generation units 101 includes PMOS transistors 104 and 105 in which the gate and drain (D) are cross-coupled. The drain (D) of the PMOS transistors 104 and 105 has a special structure as is shown in FIG. 2. The sources of the PMOS transistors 104 and 105 are commonly connected to a control terminal Vd. Each of the finger print data generation units 101 includes NMOS transistors 102 and 103 in which the gate and drain are cross-coupled. The sources of the NMOS transistors 102 and 103 are commonly connected to a GND terminal. Each drain (D) of the PMOS transistors 104 and 105 and each drain of the NMOS transistors 102 and 103 are connected to each other. Each drain of the NMOS transistors 106 and 107 are connected to each drain (D) of the PMOS transistors 104 and 105 respectively. The gates of the NMOS transistors 106 and 107 are commonly connected to a control terminal Vc. The sources of the NMOS transistors 106 and 107 are commonly connected to a control terminal Vd. The finger print data generation units 101 further include NMOS transistors 111 and 112. The NMOS transistors 111 are connected between the bit line BL0 and the drain (D) of the PMOS transistor 105. The NMOS transistors 112 are connected between the inversed bit line/BL0 and the drain (D) of the PMOS transistor 104. The gates of the NMOS transistors 111 and 112 are commonly connected to the word line WL0.

FIG. 2 is a cross sectional view of the PMOS transistors 104 and 105 (200). The PMOS transistor 200 is formed in an n-type well 202 formed in a p-type semiconductor substrate 201. The PMOS transistor 200 includes a gate insulating film 203 comprised from SiO2 formed on the surface of the n-type well 202, and a gate electrode 210 comprised from poly silicon which is formed above the gate insulating film 203. A side wall gate insulating film 204 comprised from SiO2 is formed on a side wall of the gate electrode 210. A side wall gate insulating film 205 comprised from SiN is formed above the gate insulating film 203 and the side wall gate insulating film 204.

A Schottky junction 206 is formed on one side of the gate electrode on the surface of the n-type well 202. The Schottky junction 206 is a junction of metal and semiconductor, and either a diffusion layer is not formed on the semiconductor side or a low concentration diffusion layer is formed. Although it is possible to use various metals such as Cobalt (Co), Nickel (Ni) and Titanium (Ti) in order to form Schottky junction 206, Nickel is particularly desirable. In the case when cobalt is used for the metal, bonding occurs with the silicon surface which results in a silicide. The metal side of Schottky junction 206 is drain. The Schottky junction 206 is offset from a channel region directly under the gate electrode.

A high concentration p-type diffusion layer 207 and a medium concentration p-type diffusion layer 208 are formed on the other side of the gate electrode on the surface of the n-type well 202. Furthermore, a low concentration p-type diffusion layer 209 may be formed in order to fill an offset (gap) between the channel region directly under the gate electrode and the medium concentration p-type diffusion layer 208.

Figure 3:
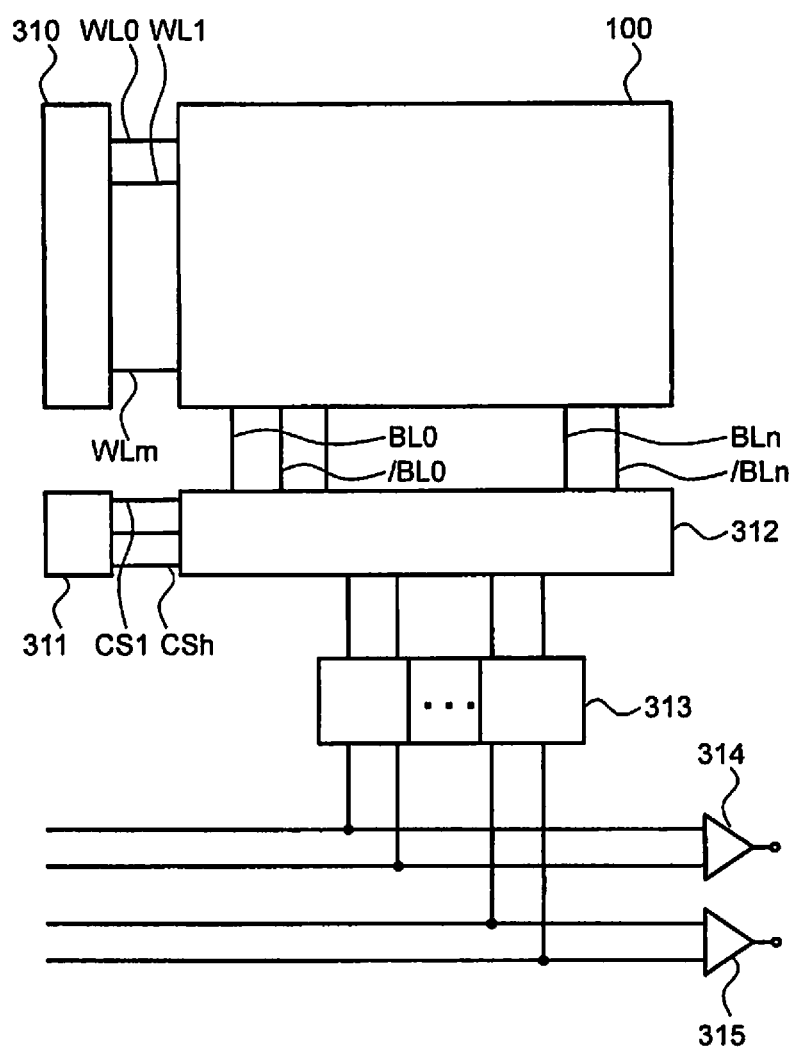
FIG. 3 is a circuit diagram of a finger print data generation circuit core (300).

FIG. 3 is a circuit diagram of a finger print data generation circuit (300). The fingerprint data generation circuit core (300) includes an array of fingerprint data generation units 100, a row decoder circuit 310, a column decoder circuit 311, a column gate a circuit 312, a sense amplifier 313, output buffers 314, 315, and a control circuit for outputting various control signals (not shown in the diagram).

Row address signals are input to row decoder circuit 310, and one of word lines WL0, WL1, . . . WLm is driven to a H level according to the row address signal.

Column address signals are input to the column decode circuit 311 and column selection lines CS1, . . . CSh are selected according to the column address signal. The column gate circuit 312 outputs 32 pairs of the bit line pairs BL0, /BL0, . . . BLn, /BLn to the sense amplifier circuit 313 according to the column selection lines CS1, . . . CSh.

The sense amplifier circuit 313 is formed from 32 of sense amplifier circuit units, amplifies the data of the selected BL, /BL pairs, and provides the amplified data to an output bus. The output buffers 314 and 315 are connected to the output bus, and data is output to the exterior of the finger print data generation circuit core (300). As is described herein, the finger print data generation circuit core (300) forms a part of a finger print data generation system (350).

2. Finger Print Data Generation and Program Operations of a Finger Print Data Generation Circuit Core.

First, the operations of a finger print data generation circuit during finger print data generation and programming is explained while referring to FIG. 1 to FIG. 4.

Figure 4:
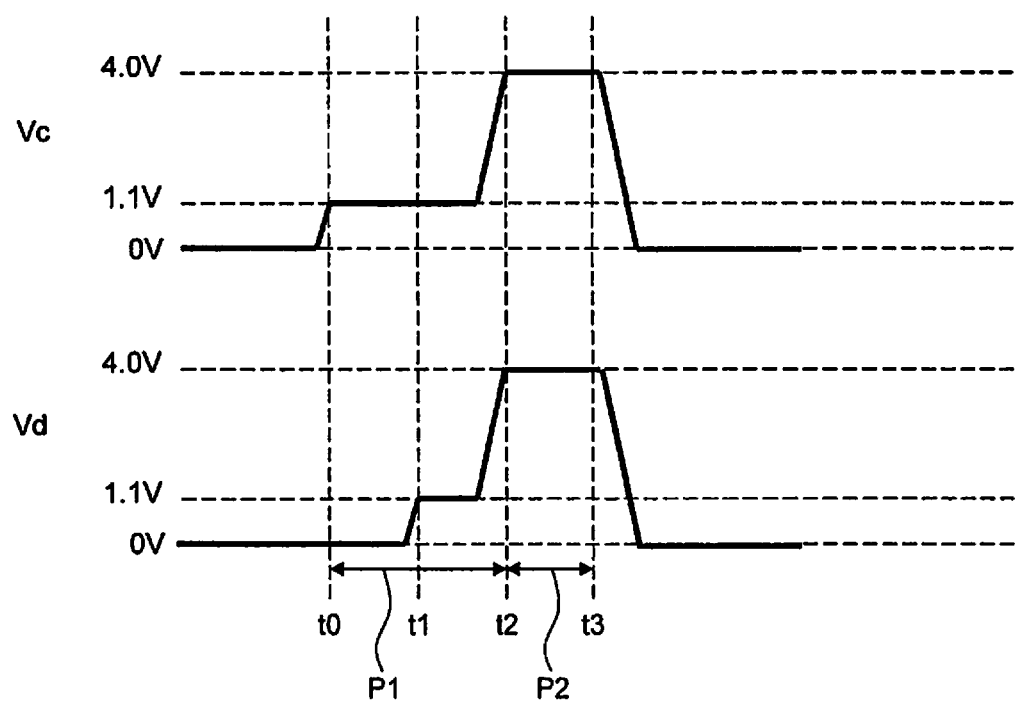
FIG. 4 is a wave form chart of control signals during finger print data generation and programming.

FIG. 4 is a wave form chart of control signals during finger print data generation and programming.

The control signals Vc and Vd are both 0V. The voltage of the word line WL0 is 0V and the NMOS transistors 111 and 112 are not conductive.

At a time t0, the control signal Vc changes from 0V to 1.1V (intermediate voltage). As a result, the NMOS transistors 106 and 107 become conductive. At a time t1, the control signal Vd changes from 0V to 1.1V. As a result, the voltages of the drains of the NMOS transistors 102 and 103 gradually increase. The NMOS transistors 106 and 107 act as a load. A threshold Vth of the NMOS transistors 102 or 103 and the conductivity of the channel are slightly varied.

If the conductivity of the NMOS transistor 102 is slightly higher than that of the NMOS transistor 103, the drain voltage of the NMOS transistor 102 becomes low which reduces the gate voltage and increases the drain voltage of the NMOS transistor 103. As a result, the drain voltage of the NMOS transistor 102 gradually decreases. By using such positive feedback, the drain voltage of the NMOS transistor 102 approaches 0V (=GND) and the drain voltage of the NMOS transistor 103 approaches 1.1V.

Conversely, if the conductivity of the NMOS transistor 103 is slightly higher than that of the NMOS transistor 102, the drain voltage of the NMOS transistor 103 becomes low which reduces the gate voltage and increases the drain voltage of the NMOS transistor 102. As a result, the drain voltage of the NMOS transistor 103 gradually decreases. By using such positive feedback, the drain voltage of the NMOS transistor 103 approaches 0V (=GND) and the drain voltage of the NMOS transistor 102 approaches 1.1V.

The threshold Vth of the NMOS transistors 102 and 103 and the conductivity of the channel are slightly varied. Since this slight variation is not uniform at all depending on the chip production process, it varies for each NMOS transistor pair. In addition, even in the case when a plurality of chips are simultaneously manufactured on the same wafer, the variation pattern is different for each chip. Furthermore, when the wafer is different, the pattern of the variation is different. As a result, the voltages of each drain of the NMOS transistors 102 and 103 which are generated by the positive feedback after t1 have a random value which is different for each chip. In addition, the random value is used as finger print data. A period P1 from the time t0 to t2 is the period of finger print data generation.

This random value is not always highly reproducible. Therefore, in order to ensure that it does not depend on reproducibility, the random value is programmed to a pair of PMOS transistors 104 and 105. At the time t2, the control signals Vc and Vd change from 1.1V to 4.0V (High Voltage). The voltages of each drain of the NMOS transistors 102 and 103 are amplified and approach 0V and 4.0V or 4.0V and 0V. Finger print data is programmed to the PMOS transistors 104 and 105.

In the case when the drain voltage of the NMOS transistor 102 is 4.0V and the drain voltage of the NMOS transistor 103 is 0V, 4.0V is applied to the gate of the PMOS transistor 105 and 0V is applied to the drain (D) of the PMOS transistor 105. The voltage of the channel of the PMOS transistor 105 is 4.0V. Since the drain (D) of the PMOS transistor 105 is a Shottky junction, it is extremely easy for hot carriers to be generated. Positive hot carriers (hot hole) among the hot carriers generated in this way are trapped on the drain (D) side of the side wall insulating films 204 and 205. The trapped positive hot carriers make it difficult for the channel vicinity below the side wall insulating films 204 and 205 to reverse from an n-type to a p-type, and the conductivity of the PMOS transistor 105 decreases. On the other hand, 0V is applied to the gate of the PMOS transistor 104 and 4.0V is applied to the drain (D) of the PMOS transistor 104. The channel voltage of the PMOS transistor 104 is 4.0V. There is no voltage difference between the source and the drain, the source and the channel, and the drain and the channel of the PMOS transistor 104, and hot carriers are not generated. Therefore, the conductivity of the PMOS transistor 104 does not decrease.

When the drain voltage of the NMOS transistor 103 is 4.0V and the drain voltage of the NMOS transistor 102 is 0V, 4.0V is applied to the gate of the PMOS transistor 104 and 0V is applied to the drain (D) of the PMOS transistor 104. The voltage of the channel of the PMOS transistor 104 is 4.0V. Since the drain (D) of the PMOS transistor 104 is a Shottky junction, it is extremely easy for hot carriers to be generated. Positive hot carriers (hot hole) among the hot carriers generated in this way are trapped on the drain (D) side of the side wall insulating films 204 and 205. The trapped positive hot carriers make it difficult for the channel vicinity below the side wall insulating films 204 and 205 to reverse from a n-type to a p-type, and the conductivity of the PMOS transistor 104 decreases. On the other hand, 0V is applied to the gate of the PMOS transistor 105 and 4.0V is applied to the drain (D) of the PMOS transistor 105. The channel voltage of the PMOS transistor 105 is 4.0V. There is no voltage difference between the source and the drain, the source and the channel, and the drain and the channel of the PMOS transistor 105, and hot carriers are not generated. Therefore, the conductivity of the PMOS transistor 105 does not decrease.

In this way, generation and programming of finger print data is carried out. The period P2 from the time t2 to the time t3 is a period of finger print data programming.

3. Finger Print Data Reading Operations of a Finger Print Data Generation Circuit Core.

Next, the operation of the finger print data generation circuit during finger print data reading is explained while referring to FIG. 1 to FIG. 5.

Figure 5:
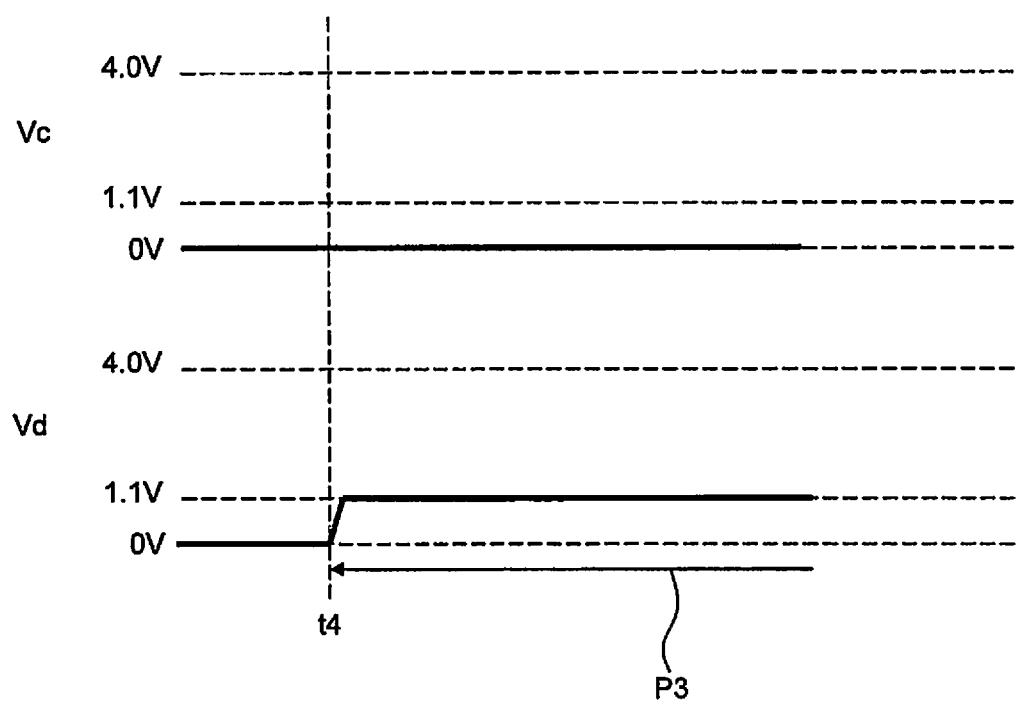
FIG. 5 is a wave form chart of control signals during finger print data reading.

FIG. 5 is a wave form chart of control signals during finger print data reading. The control signals Vc and Vd are both 0V. At the time t4, Vd becomes 1.1V. As was described above, the conductivity of one of the PMOS transistors 104 and 105 decreases. In the case when the conductivity of PMOS transistor 105 is decreasing (resistivity is increasing), the voltage of the drain of the NMOS transistor 103 approaches 1.1V and the voltage of the drain of the NMOS transistor 102 approaches 0V. In the case when the conductivity of the PMOS transistor 104 is decreasing (resistivity is increasing), the voltage of the drain of the NMOS transistor 102 approaches 1.1V and the voltage of the drain of the NMOS transistor 103 approaches 0V.

In this state, output of finger print data is performed. Refer to FIG. 3.

The row decoder circuit 310 selects the word line WL0 according to a row address signal. The voltage of the word line WL0 changes from 0V to 1.1V. Then, the NMOS transistors 111 and 112 become conductive, and one of the voltages of the bit line pair BL0, /BL0 becomes high and the other becomes low. The column decoder circuit 311 selects, for example, CS1 according to a column address signal. Then, the column gate circuit 312 connects the BL0, /BL0 pair to the sense amplifier circuit 313 and the voltage pair on the bit line is amplified. The amplified data is provided to a data bus and output to the exterior by the output buffers 314 and 315.

The period P3 after the time t4 is the period of finger print data reading.

In this way, finger print data which is different for each chip is automatically generated, the automatically generated finger print data is programmed to a pair of PMOS transistors, and the programmed finger print data is read and output. In this way, the problem of low reproducibility of intrinsic finger print data can be solved. It becomes possible to reduce overheads due to circuits (hardware) related to redundancy and it becomes possible to reduce the number of steps of software required for error correction.

4. Finger Print Data Generating System.

Figure 6:
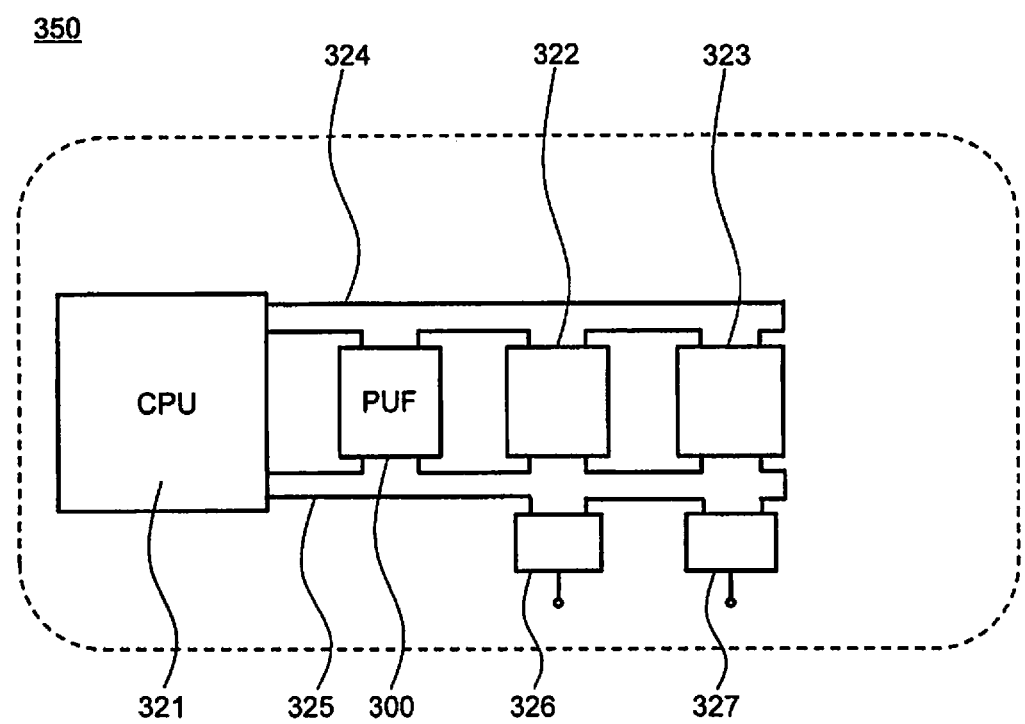
FIG. 6 is a block diagram of a finger print data generation system (350).

FIG. 6 is a block diagram of a finger print data generation system.

In addition to the finger print data generation core 300 (corresponding to PUF) described above, a finger print data generation system (350) includes a central processing unit (CPU) 321, a read only memory (ROM) 322, a random access memory (RAM) 323, an address bus 324, a data bus 325, an output buffer 326 and an input buffer 327.

The CPU 321 executes a program stored in the ROM. The RAM 323 stores data to be processed or data processed by the CPU. The finger print data generation core 300 is activated by a read command which specifies an address from the CPU 321 and provides finger print data (PFU DATA) to the data bus 325.

Figure 7:
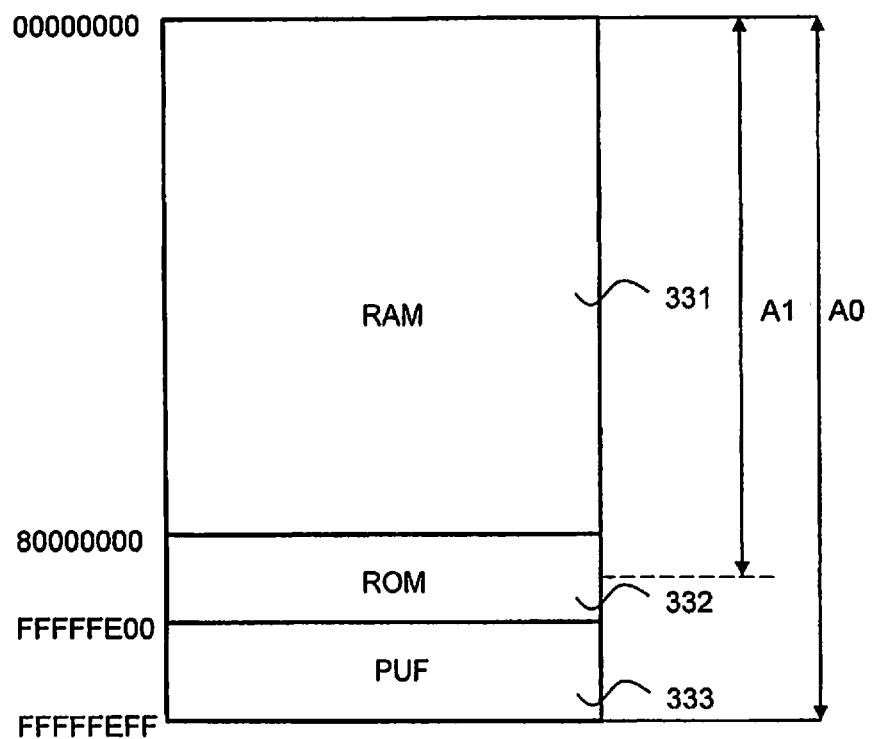
FIG. 7 is a memory mapping in an address space of a CPU.

FIG. 7 is a diagram of memory mapping in an address space of the CPU 321. PUF DATA area is embedded in the CPU memory space 330. The CPU 321 outputs 128-bit address signals. The address signals are #00000000 to #FFFFFEFF and form an address space of a total of 4 Gbits. Among them, #00000000 to #80000000 are RAM space 331, and #800000000 to #FFFFFE00 are ROM space 332. An operating system (OS) is stored in the ROM space 332. The PUF space 333 exists in #FFFFFE00 to FFFFFEFF. The CPU 321 operates in a Privileged Mode and a Normal Operation Mode. In the Normal Operation Mode, only the area A1 in FIG. 7 can be accessed. In the Privileged Mode, all areas of A0 can be accessed. A part of the ROM space 332 and PUF space 333 can not be accessed unless it is in the Privileged Mode.

Figure 8:
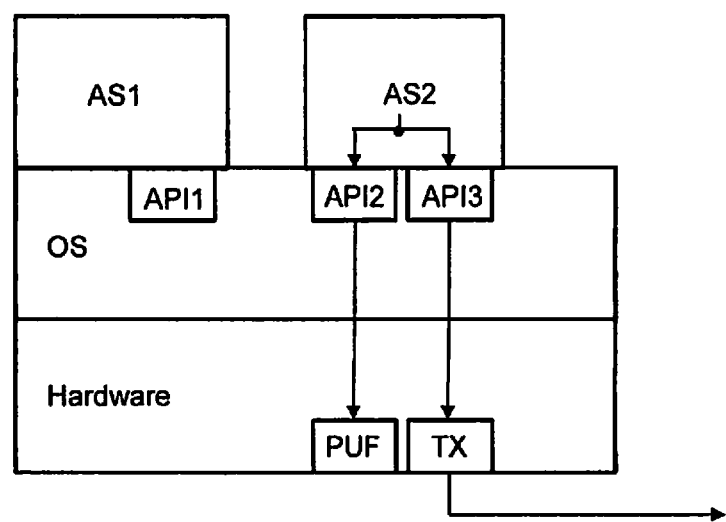
FIG. 8 is system architecture to operate a finger print data generation system.

As is shown in FIG. 8, the OS includes a program called an Application Program Interface (API) which is called from various application software (AS) and is a program which provides an interface. AS usually operates in Normal Operation Mode and a part of API operates in Privileged Mode. The AS may be stored in ROM and some AS may be loaded from outside the system. When the system is started, the CPU 321 executes from #80000000. Here, a startup program is stored. The startup program reads the OS in the ROM space 332 and is developed in the RAM space 331. Next, the OS (including the AS) developed in the RAM space 331 operates on the CPU 321.

AS cannot directly operate hardware and also can not read PUF. Therefore, the AS can only operate the PUF or a data transmission circuit (TX) via the API. Therefore, when the AS reads the PUF to acquire finger print data, an API2 including the PUF reading function is called. When the API2 is called, the CPU 321 shifts to Privileged Mode and accesses the PUF. Addresses #FFFFFE00 to #FFFFFEFF are sequentially provided on the chip to the finger print data generation circuit core 300. An address is provided in 4 cycles in the case when a data bus is 64 bits and 1 cycle when a data bus is 256 bits. The PUF data (256 bits) which is read is stored in a register of the CPU 321 and stored in the RAM space 331 as appropriate.

5. Sample Application (IoT).

Figure 9:
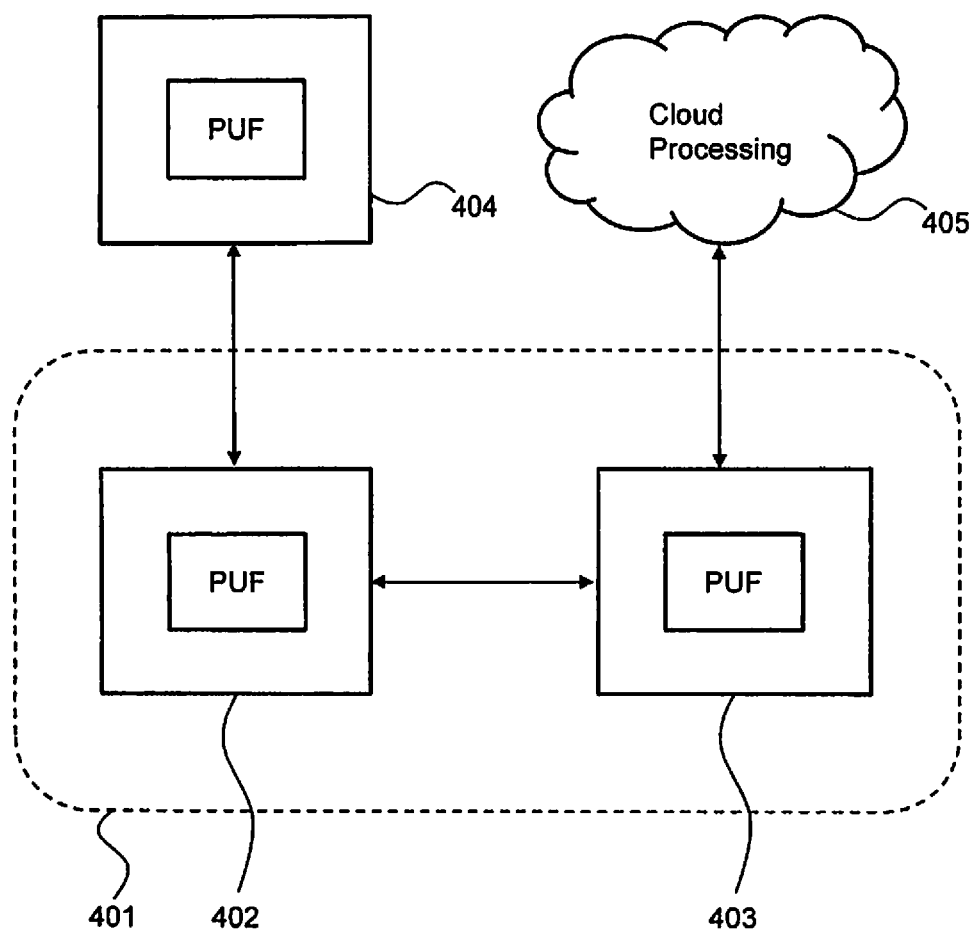
FIG. 9 is a first sample application of a finger print data generation system.

FIG. 9 is a first sample application of a finger print data generation system. A network 400 suitable for an example in which IoT (Internet of Things) is developed in a factory is shown in FIG. 9. The network 400 includes a plurality of subsystems (typically semiconductor chips including a CPU) 402, 403 and 404. The subsystems 402 and 403 are mounted in the same system (for example, a control device for controlling a machine tool in a factory) 401. The subsystem 404 is, for example, a sensor (for example, a sensor which analyzes the appearance of a product produced in a factory, analyzes a defective product, and transmits data of the analysis result to the control device 401). Each of these subsystems is equipped with a finger print data generation system (PUF). Then, a subsystem address is generated using this finger print data (PUF DATA). In this way, each subsystem is provided with a unique subsystem address. A subsystem address obtained by PUF DATA is used for data communication between subsystems. Furthermore, data obtained by a subsystem may be processed by a remote server which is connected via the Internet or the like (Cloud Processing 405).

6. Sample Application (PUF Certification).

Figure 10:
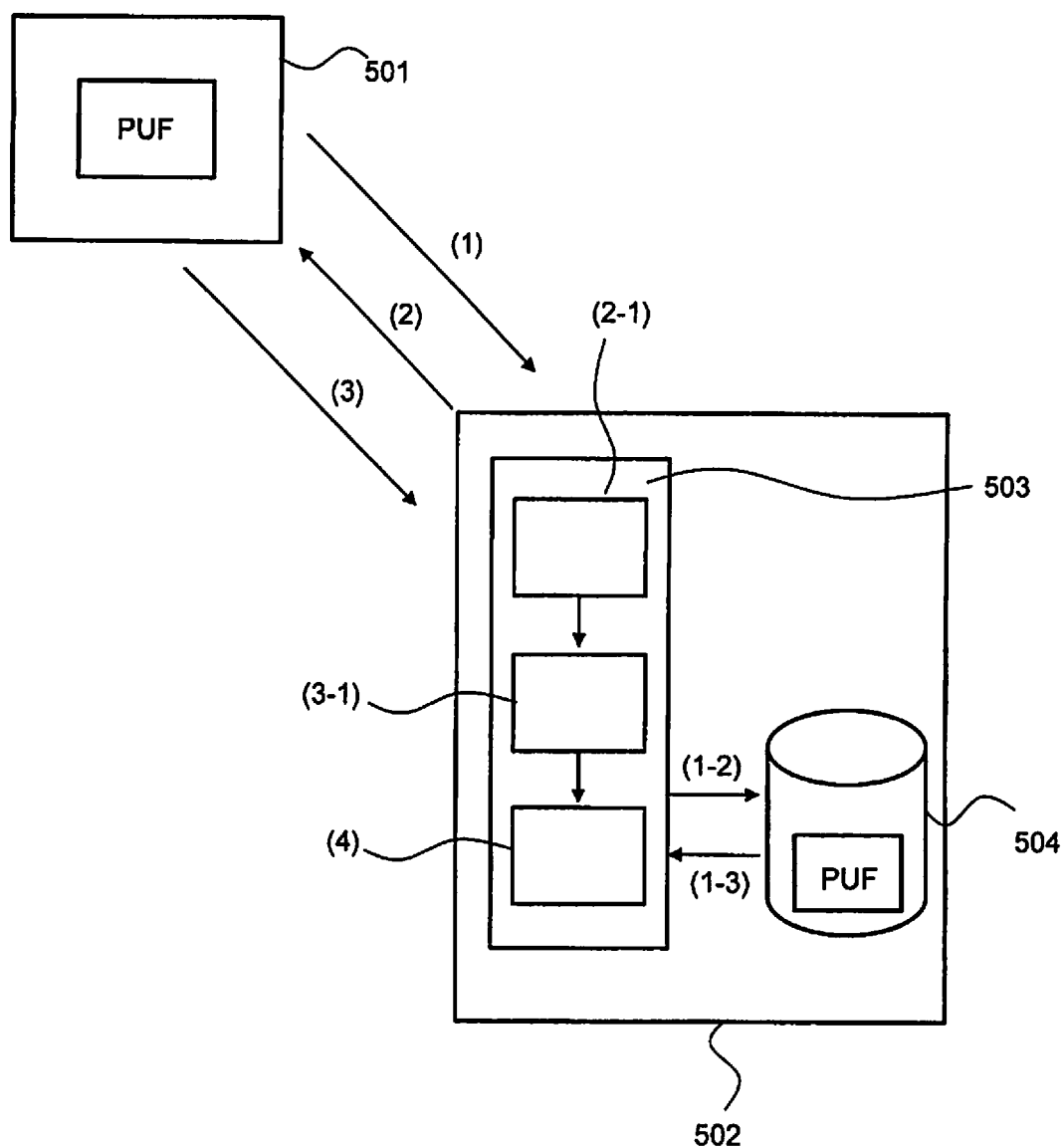
FIG. 10 is a second sample application of a finger print data generation system.

FIG. 10 is a second sample application of a finger print data generation system. In an encrypted communication system 500, a server 502 performs authentication of a mobile device 501. The mobile device 501 includes a finger print data generation system (PUF). The PUF DATA of the mobile device 501 is registered in advance in a database 504 of the server 502.

In the case when there is an authentication request (1) from the mobile device 501 to the server 502, a processing unit 503 of the server 502 makes an enquiry to a database 504 (1-2). The database 504 returns PUF DATA of the mobile device 501 (1-3).

The server 502 transmits a random number R to the mobile device 501 (2). At the same time, the PUF DATA returned from the database 504 and the random number R are calculated and a calculation result PFU*R (SV) is generated (2-1).

When the mobile device 501 receives the random number R from the server 502, PUF DATA is obtained from the PUF in the mobile device 501, the PUF DATA and the random number R are calculated to generate a calculation result PFU*R (MD) and the calculation result is transmitted to the server 502 (3). The processing unit 503 in the server 502 compares PFU*R(SV) with PFU*R(MD) (3-1).

In addition, if the comparison results match, the mobile device 501 is authenticated (4).

Furthermore, this PUF DATA may be used as encryption processing data in subsequent encrypted communication.

7. Sample Application (Secured Code Storage).

It is necessary to ensure that a secured code such as Authentication Key used for device authentication or encrypted communication can not be physically acquired from the device. When a secured code is stored in a normal NOR type flash memory including a floating gate, it is possible to read the secured code by detecting the presence or absence of a charge accumulated in the floating gate using an electron beam or the like.

In the case where a secured code is stored by trapping carriers in a side wall insulating film and not by storing in a normal NOR type flash memory including a floating gate, the secured code can not be read by irradiation of an electron beam. In the finger print data generation circuit of the present invention, as is shown in FIG. 2, finger print data is stored by trapping carriers in the side wall insulating films 204 and 205 of the PMOS transistor 200. Therefore, PUF DATA can not be read out by irradiation of an electron beam.

Furthermore, by setting a ROM which forms a ROM space to a Non Volatile ROM (NVROM) explained below, it is possible to save secured data so that it can not be read out by electron beam irradiation.

Figure 11:
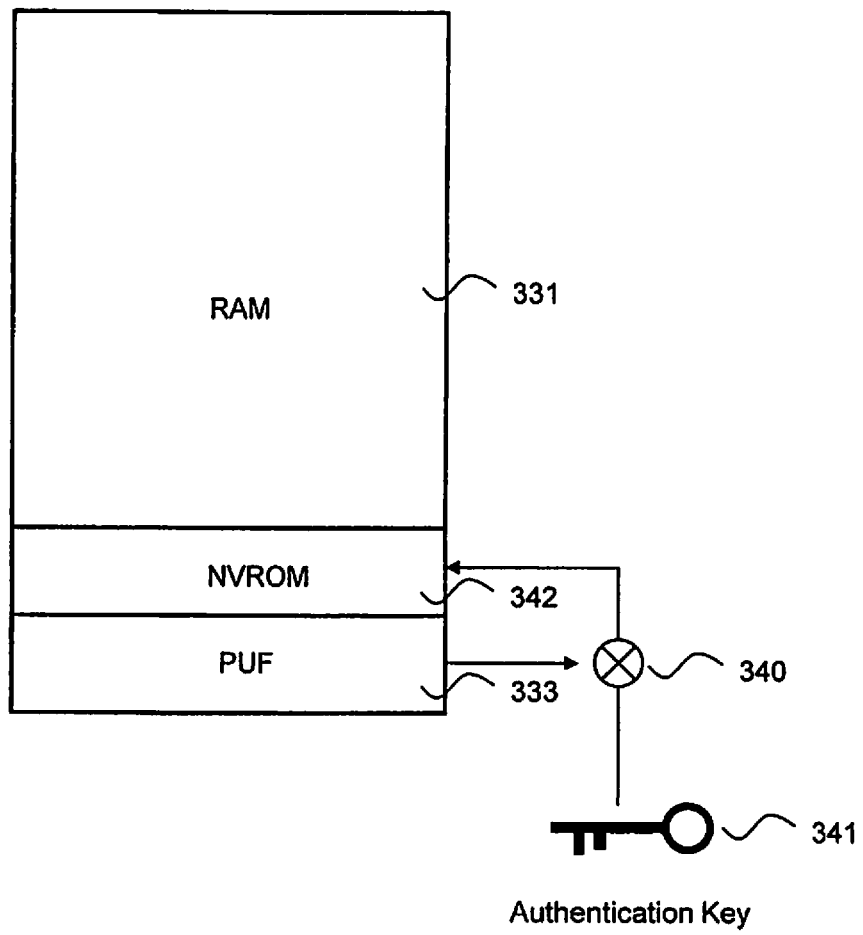
FIG. 11 is a memory mapping for secured code storage.

FIG. 11 is a memory mapping for secured code storage. A system 350 is assumed. PUF DATA area is embedded in the CPU memory space 330. The CPU memory space 330 is comprised from a RAM space 331, a ROM space 342 formed from a NVROM, and a PUF space 333. The CPU 321 operates in the Privileged Mode and the Normal Operation Mode as mentioned above.

The secured code (Authentication Key) which is set externally is not stored as it is but is encrypted (340) by the PUF and stored in the NVROM space 342. Therefore, the secured code can not be physically read unless PUF is read.

Figure 12:
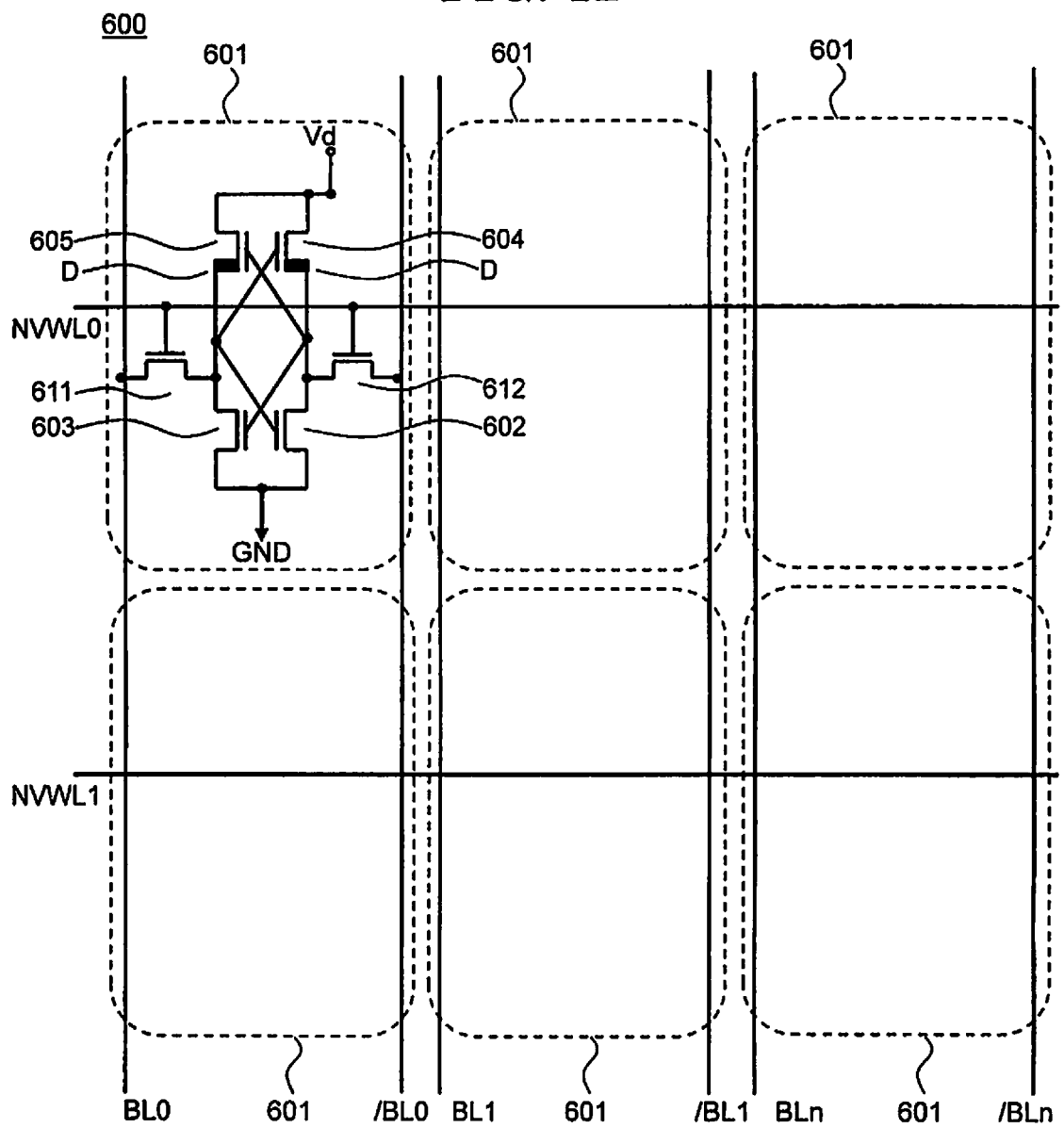
FIG. 12 is a circuit schematic of an array of Nonvolatile ROM.

FIG. 12 is a circuit schematic diagram of an array of Nonvolatile Memory Cells (NVROM array). The NVROM array 600 is formed from nonvolatile memory cells 601 arranged in a plurality of rows and a plurality of columns. The NVROM array 600 includes bit lines BL0, . . . BLn and inverse bit lines/BL0, . . . /BLn which run vertically. Furthermore, the NVROM array 600 includes nonvolatile memory word lines NVWL0, NVWL1 which run in a horizontal direction.

Each of the memory cells 601 includes PMOS transistors 604 and 605 which are cross-coupled with a gate and drain (D). The structure of the PMOS transistors 604, 605 is as shown in FIG. 2. The sources of the PMOS transistors 604 and 605 are commonly connected to the control terminal Vd. Each of the memory cells 601 includes NMOS transistors 602, 603 which are cross-coupled with a gate and drain. The sources of the NMOS transistors 602 and 603 are commonly connected to the GND terminal. Each drain (D) of the PMOS transistors 604 and 605 is connected to each drain of the NMOS transistors 602 and 603 respectively. Each of the memory cells 601 further includes NMOS transistors 611 and 612. The NMOS transistors 611 are connected between the bit line BL0 and the drain (D) of the PMOS transistor 605. The NMOS transistors 612 are connected between the inversed bit line/BL0 and the drain (D) of the PMOS transistor 604. The gates of the NMOS transistors 611 and 612 are commonly connected to the nonvolatile memory word line NVWL0.

Data programming is carried out by applying a complementary programming voltage (4.0V/0V) to the bit line pair BL0, /BL0, applying a high voltage (4.0V or higher) to the nonvolatile memory word line NVWL0, and applying 4.0V to Vd. A read operation is as described in FIG. 5.

The secured code (Authentication Key) or the result obtained by calculating a secured code (Authentication Key) with PUF is stored in the NVROM structure in this way. It is extremely difficult to physically read the stored data.

8. Comparison with Prior Art.

FIG. 13 is a chart comparing the characteristics of a prior art finger print data generation system and the present invention.

It is assumed that 256-bit PUF data is required.

While 8 k SRAM cells are required In the PRIOR ART, the present invention requires only 256 finger print data generation units.

Although the PRIOR ART requires 100 k CPU cycles for error correction processing, the present invention can read PUF DATA in one CPU cycle.

In the PRIOR ART, although an approximately 15 k gate is required when a dedicated control logic is arranged for error correction processing, the present invention does not require a complicated control logic.

What is claimed is:

1. A circuit for generating finger print code data comprising:
    plural pairs of first transistors formed on a semiconductor substrate, each of the first transistors having a source formed in the substrate, a drain formed in the substrate, a channel formed in the substrate between the source and the drain, a gate insulating layer formed on the channel, a gate electrode formed over the gate insulating layer, and an insulating sidewall formed at a side surface of the gate electrode;
    plural pairs of cross coupled second transistors, each of the plural pairs of cross coupled second transistors, having drains and commonly connected sources, corresponding to each of the plural pairs of first transistors; and
    plural pairs of third transistors, each of the plural pairs of third transistors corresponding to each of the plural pairs of cross coupled second transistors and providing loads to the drains of the corresponding pairs of cross coupled second transistors, and thereby, generating differential voltages, intrinsic to a specific semiconductor chip on which the circuit for generating finger print code data is formed, at the drains of the corresponding pairs of cross coupled second transistors;
    wherein the differential voltages are used to selectively trap carriers into the sidewalls of the corresponding pairs of first transistors.

2. The circuit for generating finger print code data according to claim 1, wherein each of the drains of the first transistors has a Shottky junction and each of the sources of the first transistors has an impurity diffusion region.

3. The circuit for generating finger print code data according to claim 2, wherein each of the first transistors is p-channel type.

4. The circuit for generating finger print code data according to claim 1, further comprising:
    a CPU for processing data for generating address signals in an address mapping; and
    a random access memory having a plurality of memory cells to storing data, the random access memory accessed by the address signals from the CPU;
    wherein the plural pairs of first transistors are also accessed by the address signals.

5. The circuit for generating finger print code data according to claim 1, further comprising:
    a CPU for reading the finger print code data from the plural pairs of first transistors, and rendering a secured code data by processing the finger print code data; and
    an output circuit for outputting the secured code data to an external device which is external to the specific semiconductor chip.

6. The circuit for generating finger print code data according to claim 5, wherein the CPU processes the finger print code data to generate the secured code data representing the specific semiconductor chip.

7. The circuit for generating finger print code data according to claim 5, wherein the CPU processes the finger print code data to generate the secured code data used for certifying the specific semiconductor chip by an external device.

8. The circuit for generating finger print code data according to claim 5, wherein the CPU processes the finger print code data to generate the secured code data used for encrypted data communication between the specific semiconductor chip and an external device.

9. The circuit for generating finger print code data according to claim 1, further comprising:
    a CPU for reading the finger print code data from the plural pairs of first transistors by a first address; and
    a random access memory cells having plural memory cells accessed by second addresses;
    wherein the first address and the second addresses are in a unitary address mapping.

10. The circuit for generating finger print code data according to claim 1, further comprising:
    an output circuit for outputting a secured code data processed from the finger print code data to an external device which is external to the specific semiconductor chip.

11. A circuit for storing secured code data comprising:
    plural pairs of first transistors formed on a semiconductor substrate, each of the first transistors having a source formed in the substrate, a drain formed in the substrate, a channel formed in the substrate between the source and the drain, a gate insulating layer formed on the channel, a gate electrode formed over the gate insulating layer, and an insulating sidewall formed at a side surface of the gate electrode;
    plural programming circuits, each of the programming circuits corresponding to each of the plural pairs of first transistors and selectively trapping carriers into the sidewalls of the corresponding pairs of first transistors; and
    plural sensing circuits, each of the sensing circuits corresponding to each of the plural pairs of first transistors and sensing differential currents flowing through the plural pairs of first transistors to generate the secured code data.

12. The circuit for storing secured code data according to claim 11, wherein each of the drains of the first transistors has a Shottky junction and each of the sources of the first transistors has an impurity diffusion region.

13. The circuit for storing secured code data according to claim 12, wherein each of the first transistors is p-channel type.

14. The circuit for storing secured code data according to claim 11, further comprising:
   a CPU for processing data for generating address signals in an address mapping; and
   a random access memory having a plurality of memory cells to storing data, the random access memory accessed by the address signals from the CPU;
   wherein the plural pairs of first transistors are also accessed by the address signals.

15. The circuit for storing secured code data according to claim 11, further comprising:
   a CPU for reading a finger print code data and rendering the secured code data; and
   an output circuit for outputting the secured code data to an external device.

16. The circuit for storing secured code data according to claim 11, wherein the CPU processes the finger print code data to generate the secured code data representing the specific semiconductor chip.

17. The circuit for storing secured code data according to claim 15, wherein the CPU processes the finger print code data to generate the secured code data used for certifying the specific semiconductor chip on which the circuit for string secured data is formed by an external device.

18. The circuit for storing secured code data according to claim 15, wherein the CPU processes the finger print code data to generate the secured code data used for encrypted data communication between the specific semiconductor chip on which the circuit for string secured data is formed and an external device.

19. The circuit for storing secured code data according to claim 11, further comprising:
   a CPU for reading the finger print code data from the plural pairs of first transistors by a first address; and
   a random access memory cells having plural memory cells accessed by second addresses;
   wherein the first address and the second addresses are in a unitary address mapping.

20. The circuit for storing secured code data according to claim 11, further comprising:
   an output circuit for outputting a secured code data processed from the finger print code data to external device.

* * * * *